United States Patent [19]

Hamilton, Jr. et al.

[11] 4,355,786

[45] Oct. 26, 1982

[54] TORCH MOUNTING APPARATUS IN A CUTTER MACHINE

[76] Inventors: Robert H. Hamilton, Jr., 2688 11th Ave.; Steven E. Adams, 3328 Columbine, both of Lebanon, Oreg. 97355

[21] Appl. No.: 293,927

[22] Filed: Aug. 18, 1981

[51] Int. Cl.³ .............................................. B23K 7/10
[52] U.S. Cl. ........................................ 266/62; 266/77
[58] Field of Search ........................ 266/62, 72, 77, 66

[56] References Cited

U.S. PATENT DOCUMENTS

| | | | |
|---|---|---|---|
| 1,582,033 | 4/1926 | Godfrey | 266/62 |
| 2,040,914 | 5/1936 | Anderson | 266/62 |
| 2,178,938 | 11/1939 | Ohmstede | 266/62 |
| 2,321,949 | 6/1943 | Sorensen | 266/62 |
| 3,075,758 | 1/1963 | Gloor | 266/62 |
| 3,387,375 | 6/1968 | Nowotny | 266/62 |
| 3,417,477 | 12/1968 | Nowotny | 266/62 |

*Primary Examiner*—W. Stallard

*Attorney, Agent, or Firm*—Kolisch, Hartwell & Dickinson

[57] ABSTRACT

Apparatus adapting a guide device for use with a hand-holdable cutting torch. The guide device has an articulated arm whose free end is movable in a planar path defined by a stationary pattern template which the arm engages. The torch is of a type having a barrel, a handle carried on the barrel, an elongated nozzle, and an angled connection between the barrel and nozzle. The adapting apparatus includes a bushing for releasably clamping the torch nozzle, and a bushing-support plate carried on the free end of the arm in the guide device. The bushing, with the torch nozzle clamped therein, is mounted on the support plate for rotation relative thereto about the axis of the torch nozzle, where this axis is disposed substantially normal to the plane of arm movement. The apparatus enables the user to guide the movement of the arm along the template path by manipulating the torch handle.

3 Claims, 4 Drawing Figures

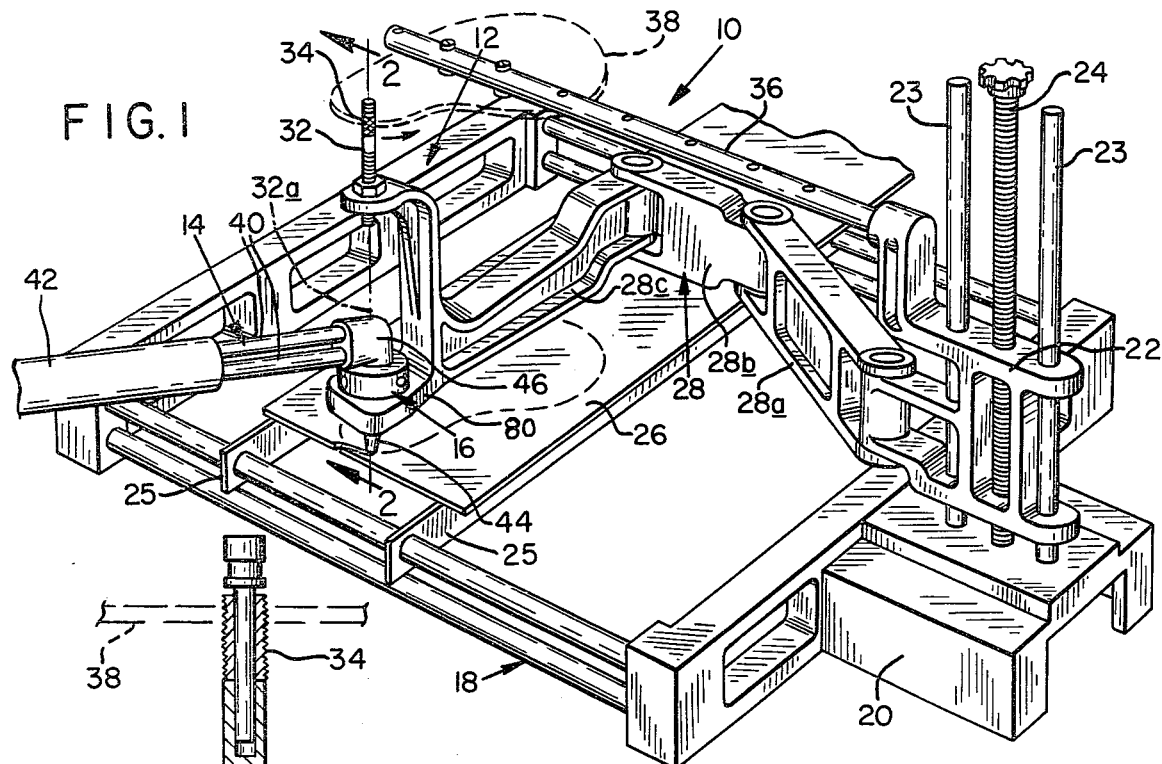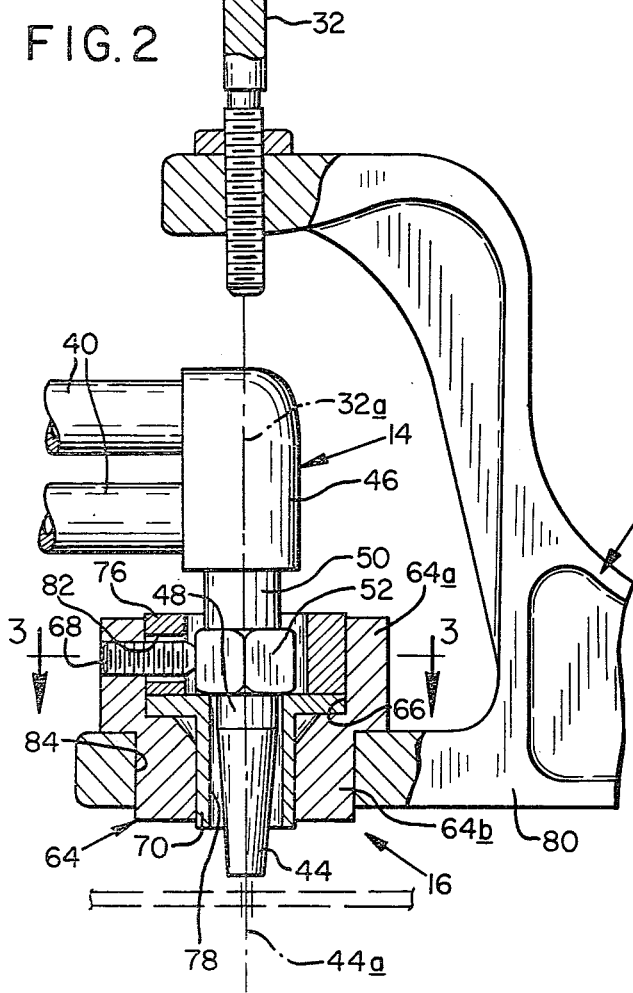

TORCH MOUNTING APPARATUS IN A CUTTER MACHINE

BACKGROUND AND SUMMARY

The present invention relates to torch cutting machines, and in particular, to a machine which employs a removable hand-holdable cutting torch.

Torch cutting machines whose operation involve the guided movement of a cutting torch over the surface of a workpiece are well known in the prior art. The usual machine of this type includes a guide device having an articulated arm whose free end is movable above the workpiece in a planar path defined by a stationary pattern template which the arm engages. The cutting torch in a typical machine of this type is a custom item designed to be rigidly mounted in a special holder carried at the end of the arm.

Torch cutting machines of the type just-described are relatively expensive, in that both a guide device and a cutting torch specially manufactured for use therewith, must be supplied. Often, more than one size of cutting torch will be required, adding to the expense of the machine.

The present invention contemplates apparatus adapting a guide device of the general type described above for use with a conventional hand-holdable cutting torch, where the torch has a barrel, a handle carried on the barrel, an elongated nozzle, and an angled connection between the barrel and the nozzle.

The apparatus includes a bushing adapted for releasably clamping the torch nozzle, and a bushing-support plate carried on the free end of an articulated arm in the guide device. The bushing, with the torch clamped therein, is mounted on the support plate for free rotation about the axis of the torch nozzle, where this axis is disposed substantially normal to the plane of arm movement in the device. The apparatus allows the torch to function as a swingable handle on the arm for guiding movement of the arm and torch.

In a preferred embodiment of the invention, the bushing is adaptable for clamping a torch nozzle having either one of two substantially different but known conventional sizes.

One general object of the present invention, therefore, is to provide apparatus adapting an articulated-arm guide device for use with a conventional hand-holdable torch.

Another object of the invention is to provide apparatus for mounting a hand-holdable torch on the arm in a guide device in a manner which allows the torch to function as a swingable handle usable in guiding the arm.

Still another object of the present invention is to provide such apparatus adapting a guide device for use with hand-holdable torches having either one of two different, but known, conventional sizes of nozzles.

These and other objects and features of the present invention will become more fully apparent when the following detailed description of a preferred embodiment of the invention is read in conjunction with the accompanying drawings.

DESCRIPTION OF THE DRAWINGS

FIG. 1 is a perspective view of a torch cutting machine employing the apparatus of the present invention;

FIG. 2 is an enlarged fragmentary sectional view taken generally along line 2—2 in FIG. 1;

FIG. 3 is a fragmentary sectional view taken generally along line 3—3 in FIG. 2; and FIG. 4 shows structure seen sectionally in FIG. 2, where the torch shown fragmentarily has a larger nozzle diameter than that of the torch seen fragmentarily in FIG. 2.

DETAILED DESCRIPTION OF A PREFERRED EMBODIMENT OF THE INVENTION

FIG. 1 shows at 10 a torch-cutting machine composed generally of a guide device 12, a hand-holdable cutting torch 14, and an adapter apparatus 16 constructed according to the present invention, adapting device 12 for use with the torch.

Describing those parts of device 12 which are necessary for an understanding of the present invention, a base 18 in the device includes a block 20 on which a support member 22 is mounted for selective vertical positioning with respect to the base. Member 22 is shiftable on upright guides 23 by the screw-drive mechanism shown at 24. A pair of spaced parallel support bars 25 in base 18 are adapted to support a workpiece, such as the one shown at 26.

An articulated arm 28 in device 12 is pivotally mounted on member 22 for vertical shifting therewith. The arm is composed of three sections 28a, 28b, 28c, which are independently pivotable about upright axes, permitting the free, or distal end of the arm to be moved freely within a planar region normal to the arm's pivot axes. As seen in FIGS. 1 and 2, a follower pin 32 is mounted on an upper projection on the free end of arm 28 to extend along an upright axis 32a. The upper end of pin 32 is provided with a freely rotatable sleeve 34 (FIG. 2).

A pattern support bar 36 is rigidly mounted on member 22 for vertical movement therewith, and extends across base 18 as shown. Support bar 36 supports a pattern template, such as one shown in dashed lines at 38, at a desired stationary position thereon. The peripherial edge of the supported template is engageable by sleeve 34 in pin 32, to guide the arm in a planar path defined by the template. Pin 32 is also referred to herein as means for engaging a pattern template.

Torch 14 is a conventional hand-holdable cutting torch which is supplied by regulatable flows of compressed combustible gas and air through a pair of gas-supply tubes 40. The tubes form an elongate barrel on which is mounted a handle 42. A nozzle 44 in the torch is connected to tubes 40, substantially at right angles thereto, by a manifold connector 46. With reference particularly to FIG. 2, an upper cylindrical portion 48 in the nozzle is threadedly joined to an outlet 50 in connector 46 by hex nut 52. The axis of nozzle 44 is indicated by a dash-dot line at 44a. This axis is coaxial within axis 32a.

According to an important feature of the present invention, apparatus 16 is usable to adapt device 12 for hand-holdable torches having either two of substantially different, but known conventional nozzle sizes. Torch 14, seen in FIGS. 1-3, is representative of a torch having a relatively small conventional nozzle size; a torch shown fragmentarily at 54 in FIG. 4 is representative of a torch having a relatively large conventional nozzle size. Torch 54 includes a nozzle 56 joined to a connector 60 by a hex nut 58. An upper cylindrical portion 62 in the nozzle, and nut 58 are substantially larger than corresponding parts in touch 14. The axis of nozzle 56 is shown in dash-dot line at 56a.

Considering now the apparatus of the invention (as adapted alternately to handle the two sizes of torches mentioned), such includes a bushing 64 which is shown in radial cross section in FIGS. 2 and 4, and in axial cross section in FIG. 3. The bushing includes upper and lower cylindrical portions 64a, 64b, respectively, having the differing inner and outer diameters seen in FIGS. 2 and 4. As can be seen best in the latter figure, the bores formed in portions 64a, 64b, join through a radially extending annular shoulder and a frustoconical surface. The bore in portion 64a, is designated 65. The bore in portion 64b, designated 66, is also referred to herein as a first opening. Bores 65, 66 are dimensioned to receive freely the nut and nozzle of torch 54 as shown. Three allen-head clamping screws, such as screw 68, are used in clamping the torch in the bushing. These screws are distributed in equal angularly spaced threaded radial bores provided in portion 64a.

An adapter 70, seen cross sectionally in FIG. 2, adapts bushing 64 for clamping the smaller of the two torches, such as torch 14. The adapter is received slidably in bores 65,66.

A ring 76 which is insertable into the upper part of bore 65, above adapter 70, has an inner bore which provides receptive clearance for nut 52. The central bore in adapter 70 freely receives nozzle 44.

Screws, such as screw 68, extend through three angularly spaced clearance openings, such as opening 82, in ring 76. The screws cooperate to clamp the torch nozzle, such as nozzle 44 in torch 14, or nozzle 56 in torch 54, in bushing 16 at a centered position, where the nozzle axis coincides with the bushing axis.

Considering now the means in apparatus 16 used in mounting bushing 16 on arm 28, a projection or support plate 80, is formed on the end section 28c in arm 28. Projection 80 lies substantially in a plane paralleling the plane of the movement of the arm, and includes a bore 84 dimensioned freely to receive portion 64b in bushing 64. With the bushing so received (as shown), it is freely rotatable about axis 32a.

Explaining how the apparatus of the invention performs, bushing 64 is clamped onto the hex nut in whichever torch is chosen for use. In the event that a large-body torch, like torch 54, is selected, the bushing is used without adapter 70 and without ring 76. This situation is illustrated in FIG. 4. Where a small-body torch, like torch 14, is to be used, the same is clamped in the bushing utilizing adapter 70 and ring 76. FIG. 1, 2 and 3 illustrate this situation. The small diameter portion 64b of the bushing is then seated in bore 84.

With a workpiece which is to be cut in place, the height of the nozzle thereabove is adjusted through manipulation of mechanism 24.

With the torch activated, the handle of the same is employed conveniently to manipulate the entire assemblage to guide pin sleeve 34 along the outer periphery of the template mounted on support bar 36. The rotatable mounting provided for bushing 64 facilitates manipulation of the assemblage through manipulation of the handle in the torch. In other words, an operator can easily maneuver the apparatus to follow a template while holding the handle of the torch at any comfortable and convenient angle.

It is obviously a very simple matter to change from one size torch to another whenever the particular cutting operation desired requires. Thus, the apparatus of the invention enhances the utility and versatility of a cutting machine like machine 10.

While a preferred embodiment of the invention has been described herein, it is apparent that various changes and modifications in the apparatus can be made without departing of the spirit of the invention.

It is claimed and desired to secure by Letters Patent:

1. Apparatus adapting a guide device for use with a cutting torch, where the guide device includes an articulated arm having a distal end which is freely movable in a plane, and means adjacent said distal end adapted to engage a pattern template as the arm is guided by such a template in such plane, and where the torch includes a handle and an elongated nozzle disposed at an angle relative to the handle and having a flame-directed cutting axis, said apparatus comprising
    a bushing adapted for releasable clamping onto such a nozzle, and
    means formed adjacent said distal end for receiving said bushing freely for rotational movement with respect thereto about the nozzle's cutting axis, with such axis disposed substantially normal to said plane, and directed into said zone, enabling arm-guided movement of the torch by manipulation of the torch's handle.

2. The apparatus of claim 1, wherein said bushing defines a first opening adapted to receive a torch nozzle of one diameter, and which further includes an adapter removably receivable in said first opening, defining a second opening coaxial with said first opening for receiving a torch nozzle having a diameter smaller than said one diameter.

3. Torch cutting apparatus comprising
    a base adapted to support a workpiece,
    an articulated arm mounted on said base and having a distal end which is movable freely within a planar region disposed above said base,
    engaging means adjacent said distal end adapted to engage a pattern template as the arm is guided by such a template in said region,
    a hand-held torch including a handle and an elongated nozzle disposed at an angle relative to said handle,
    a bushing releasably clamped onto said nozzle,
    means formed adjacent said distal end for receiving said bushing freely for rotational movement with respect thereto about the nozzle's axis which is disposed substantially normal to the plane of said region,
    said bushing and said receiving means enabling arm-guided movement of said torch by manipulation of said handle.

* * * * *